United States Patent

Fukuda et al.

[11] Patent Number: 5,953,290
[45] Date of Patent: *Sep. 14, 1999

[54] RECORDING MEDIUM AND REPRODUCTION APPARATUS FOR DISPLAYING DISPLAY DATA SYNCHRONOUSLY WITH REPRODUCTION OF AUDIO DATA

[75] Inventors: Hideki Fukuda, Katano; Kazuhiro Yamanishi, Kashiwara; Yoshihisa Fukushima, Osaka, all of Japan

[73] Assignee: Matsushita Electric Industrial Co., Ltd., Kadoma, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/734,351

[22] Filed: Oct. 21, 1996

[30] Foreign Application Priority Data

Oct. 24, 1995 [JP] Japan .................................. 7-275318

[51] Int. Cl.$^6$ ........................................................ G11B 7/00
[52] U.S. Cl. ........................................................ 369/32
[58] Field of Search ................................ 369/275.3, 275.2, 369/32, 48, 54, 58, 60

[56] References Cited

U.S. PATENT DOCUMENTS

| | | | |
|---|---|---|---|
| 5,235,581 | 8/1993 | Miyagawa et al. | 369/44.12 |
| 5,469,370 | 11/1995 | Ostrover et al. | 369/60 |
| 5,519,681 | 5/1996 | Maeda et al. | 369/60 |
| 5,570,340 | 10/1996 | Lee et al. | 369/275.3 |
| 5,587,979 | 12/1996 | Bluthgen | 369/275.3 |

FOREIGN PATENT DOCUMENTS

| | | |
|---|---|---|
| 63-141147 | 6/1988 | Japan . |
| 6424678 | 1/1989 | Japan . |
| 413288 | 1/1992 | Japan . |
| 457275 | 2/1992 | Japan . |
| 5224683 | 9/1993 | Japan . |
| 686224 | 3/1994 | Japan . |
| 6150625 | 5/1994 | Japan . |
| 6237430 | 8/1994 | Japan . |
| 6259937 | 9/1994 | Japan . |
| 7182789 | 7/1995 | Japan . |
| 7240065 | 9/1995 | Japan . |

*Primary Examiner*—Nabil Hindi
*Attorney, Agent, or Firm*—Renner, Otto, Boisselle & Sklar, P.L.L.

[57] ABSTRACT

A recording medium includes an audio data group including a plurality of types of audio data; audio reproduction time information for regulating a time to reproduce each of the plurality of types of audio data; a display data group including a plurality of types of display data; and display reproduction time information for regulating a time to reproduce each of the plurality of types of display data.

11 Claims, 8 Drawing Sheets

RECORDING MEDIUM AND REPRODUCTION APPARATUS FOR DISPLAYING DISPLAY DATA SYNCHRONOUSLY WITH REPRODUCTION OF AUDIO DATA

BACKGROUND OF THE INVENTION

1. Field Of The Invention

The present invention relates to a recording medium for storing data and a reproduction apparatus for reproducing the data stored in the recording medium.

2. Description Of The Related Art

Recently, laser disks and video CDs (compact disks) have been input into practical use as optical recording media for storing multi-media data including moving picture data, audio data and sub-picture data.

Among these media, video CDs are used for storing moving picture data on a CD, having a memory capacity of about 600 megabytes and originally used for storing digital audio data, using MPEG. MPEG is a technology for compressing moving picture data at a high ratio. Many laser disks used in a variety of fields, for example, laser disks used in "karaoke" bars to show the singer the lyrics of the song are being replaced with video CDs.

Today, active studies are being conducted to improve the memory capacity of optical disks. In order to raise the memory capacity of optical disks, the diameter D of a light spot on the optical disk needs to be reduced. Where the wavelength of the laser light is λ and the numerical aperture of the objective lens is NA, the diameter D of the light spot is in proportion to λ/NA. That is, the memory capacity can be higher as the wavelength λ is smaller and the numerical aperture NA is greater.

When a lens having a greater numerical aperture is used, frame aberration caused by tilt, which is the relative angle of the optical axis of the optical beam with respect to the surface of the optical disk, increases as described in, for example, the U.S. Pat. No. 5,235,581. In order to prevent the frame aberration, the thickness of the transparent substrate needs to be reduced. A thinner substrate has a lower mechanical strength, which can be effectively compensated for by reinforcing the substrate with another substrate. The reinforcement is more effective when the two substrates have an identical thickness and are formed of an identical material.

Digital video disks (hereinafter, referred to as "DVDs") are also being developed today. For reading data from the DVD, a semiconductor laser for generating red light having a wavelength of as short as 650 nm and an optical system including an objective lens having a numerical aperture of as great as 0.6 mm are used. A DVD having a 120 mm diameter for storing 5 gigabyte data on one side has been proposed by using the above-mentioned semiconductor laser and optical system in combination with a substrate having a thickness of as small as 0.6 mm.

Memory disks having such a large memory capacity show their specific value in the field of multimedia, in which a plurality of moving picture data, a plurality of audio data, a plurality of graphic data and the like are reproduced through dialogue with the user.

SUMMARY OF THE INVENTION

According to one aspect of the present invention, a recording medium includes an audio data group including a plurality of types of audio data; audio reproduction time information for regulating a time to reproduce each of the plurality of types of audio data; a display data group including a plurality of types of display data; and display reproduction time information for regulating a time to reproduce each of the plurality of types of display data.

In one embodiment of the invention, the audio data group includes audio data corresponding to a first language and audio data corresponding to a second language different from the first language, and the display data group includes display data representing character information corresponding to at least one of the first language and the second language.

In another embodiment of the invention, at least one of the plurality of types of display data includes bit map data.

In still another embodiment of the invention, the bit map data is variable-length data.

In yet another embodiment of the invention, the bit map data is run-length-coded data.

According to another aspect of the present invention, a reproduction apparatus includes a reading section for reading data from a recording medium; an analyzer for analyzing the data read by the reading section to separate, from the data, an audio data group including a plurality of types of audio data and a display data group including a plurality of types of display data, thereby acquiring audio reproduction time information for regulating a time to reproduce each of the plurality of types of audio data and display reproduction time information for regulating a time to reproduce each of the plurality of types of display data; an audio selector for selecting one of the plurality of types of audio data in accordance with an audio data selection signal; a display selector for selecting one of the plurality of types of display data in accordance with a display data selection signal; an audio reproducer for reproducing the audio data selected by the audio selector; a display processor for reproducing the display data selected by the display selector; and a phase controller for controlling the audio reproducer and the display processor in accordance with the audio reproduction time information and the display reproduction time information so that a reproduction time for the audio data selected by the audio selector corresponds to a reproduction time for the display data selected by the display selector.

In one embodiment of the invention, the audio data group includes audio data corresponding to a first language and audio data corresponding to a second language different from the first language, and the display data group includes display data representing character information corresponding to at least one of the first language and the second language.

In another embodiment of the invention, at least one of the plurality of types of display data includes bit map data.

In still another embodiment of the invention, the bit map data is variable-length data.

In yet another embodiment of the invention, the bit map data is run-length-coded data, and the reproduction apparatus further comprises a run length decoder for run-length-decoding the bit map data.

In yet another embodiment of the invention, the display data selection signal depends on the audio data selection signal.

In yet another embodiment of the invention, the audio data group includes audio data corresponding to a first language and audio data corresponding to a second language different from the first language, and when the audio data selection signal indicates that the audio data corresponding to the first language is selected, the display selection signal indicates that the display data corresponding to the first language is selected.

In yet another embodiment of the invention, the phase controller adjusts the reproduction time for the display data in relation with the audio data so that the audio data and the display data are synchronized with each other.

Thus, the invention described herein makes possible the advantages of (1) providing a recording medium and reproduction apparatus for displaying display data synchronously with reproduction of audio data, (2) providing a recording medium and reproduction apparatus usable for a plurality of languages, and (3) providing a recording medium and reproduction apparatus for displaying character data and also graphical image patterns.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Recording medium

Various types of data can be recorded in a recording medium as one data file. For example, audio data and display data for one title can be recorded as one data file. Each data file includes a plurality of types of audio data and a plurality of types of display data. The plurality of types of audio data include, for example, audio data in a plurality of languages such as Japanese audio data and English audio data. The plurality of types of display data include, for example, character data in a plurality of languages such as Japanese character data and English character data, and also include graphic data.

A unit of data obtained by dividing the audio data or the display data stored in each data file by a unit of a prescribed time period t is referred to as a "pack". A plurality of types of audio data are packed type by type, whereas a plurality of types of display data are packed as one pack regardless of the type.

The audio data can be coded with one of several different systems such as the linear PCM system used for CDs or the like, the MPEG audio system which is an international standard, and the AC3 system used for DVDs or the like. The audio data is recorded in the recording medium in the state of being coded.

EXAMPLE 1

Recording medium

Hereinafter, a first example of a recording medium according to the present invention will be described.

Figure 1:
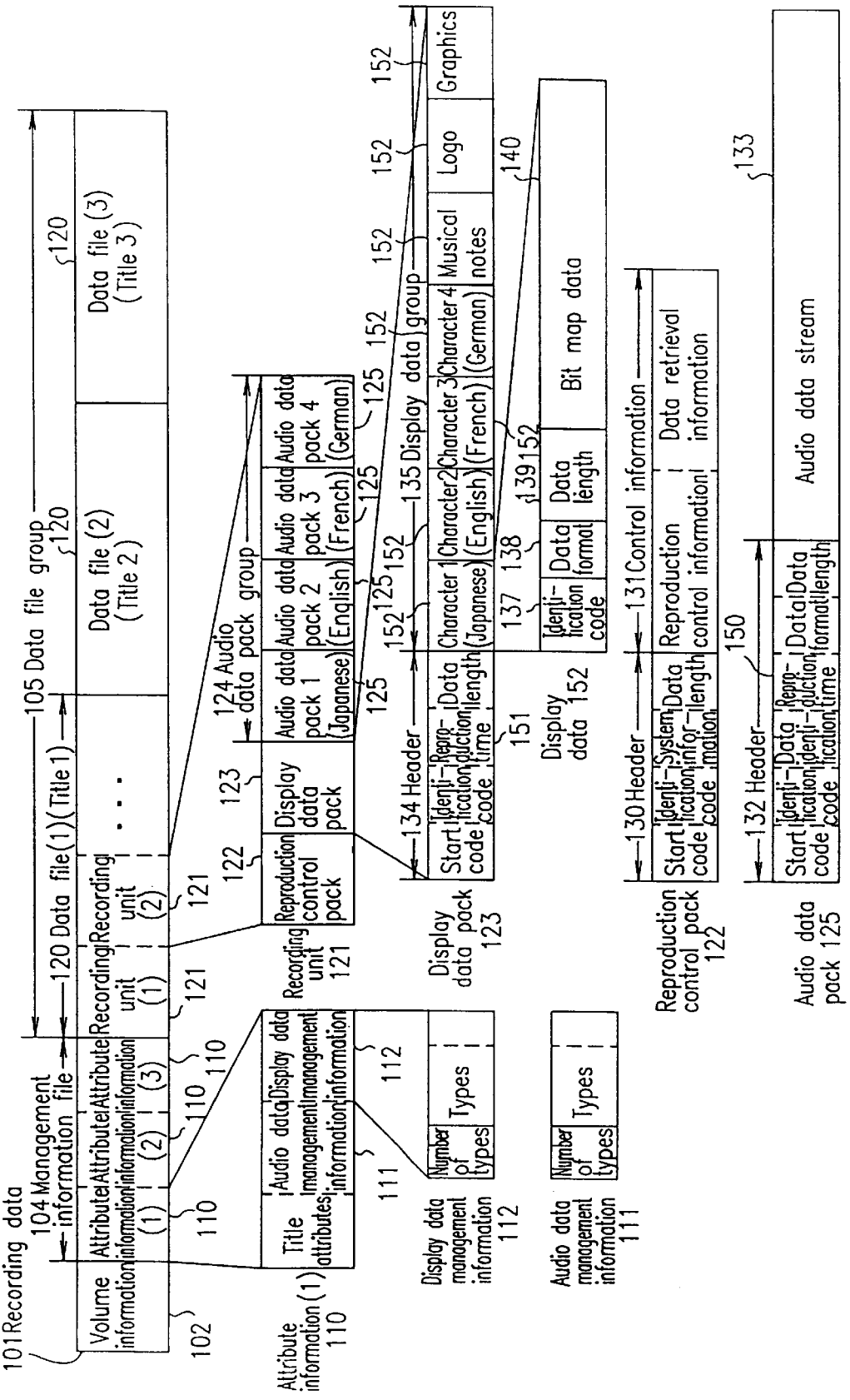
FIG. 1 shows a structure of data which can be recorded to a recording medium according to the present invention.

FIG. 1 shows a structure of data to be recorded in a recording medium in the first example. In this example, the structure of the data corresponding to three tunes (i.e., three data files) to be recorded in the recording medium will be described.

Recording data 101 to be recorded into the recording medium includes volume information 102 and a plurality of files.

In the volume information 102, physical management information of each file regarding the recording medium, such as the recording start address and data size of each file is stored.

Each of the plurality of files includes a management information file 104 and a data file group 105.

The management information file 104 includes a plurality of units of file attribute information 110. In each unit of file attribute information 110, information on the attributes of the corresponding data file among the three data files is described. In the example shown in FIG. 1, the units of file attribute information 110(1) through 110(3) regarding the three data files are described in the management information file 104.

Each unit of file attribute information 110 includes title attributes, audio data management information 111, and display data management information 112.

In the title attributes, attributes of the data file such as the name of the title, the order of reproduction, and reproduction time are described.

In the audio data management information 111, management information on the audio data such as the number of types of audio data, information on the types of audio data, and reproduction time is recorded. Recorded in, for example, the audio data management information 111 regarding title 1 shown in FIG. 1 are (1) information that the number of the types of audio data is 4 and (2) information on the types of audio data, i.e., the information that represents that Japanese audio information, English audio information, French audio information, and German audio information are stored. Also recorded in audio data management information 111 is information representing the data format of the audio data. The information representing the data format is used to, for example, identify one of the coding systems among the linear PCM, MPEG audio, and AC3 systems, which was used for coding the audio data.

In the display data management information 112, management information on the display data such as the number of types of display data, information on the types of display data, and reproduction time is recorded. Recorded in, for example, the display data management information 112 regarding title 1 shown in FIG. 1 are (1) information that the number of the types of display data is 7 and (2) information on the types of display data, i.e., the information that represents that Japanese character information 1, English character information 2, French character information 3, and German character information 4, musical note information, logo information and graphic information are stored. Also recorded in the display data management information 112 is information representing the data format of the display data. The information representing the data format is used to, for example, determine whether the display data (bit map data) has been compression-coded using run length coding or the like or non-compression-coded.

By referring to the management information file 104, a reproduction apparatus can identify the number of titles stored in the recording medium, names of the titles, the reproduction time, the types of the audio data, whether display data is stored or not, the types of the display, and the like.

When a plurality of types of display data are stored in the recording medium, the reproduction apparatus can selectively output one of the plurality of types of display data. The plurality of types of display data can include character information in a plurality of languages. When such a recording medium is combined with a reproduction apparatus having a function of selectively outputting the character information in any one of a plurality of languages, a multi-lingual system is realized.

The data file group 105 includes a plurality of data files 120 which respectively correspond to the titles. In the example shown in FIG. 1, the data files 120(1) through 120(3) correspond to the three titles.

Each data file 120 includes a plurality of recording units 121. Each of the plurality of recording units 121 includes packs each obtained by dividing the audio data or the display data by a unit of prescribed time period t. A plurality of types of audio data are packed type by type, but a plurality of types of display data are packed as one pack regardless of the type. Accordingly, each recording unit 121 includes one display data pack 123 and a plurality of audio data packs 125. The plurality of audio data packs 125 will be collectively referred to as an audio data pack group 124.

As described later in detail, the display data pack 123 includes a display data group 135, which includes a plurality of types of display data 152.

In the case where character information and simple graphic data are displayed as display data in a liquid crystal display provided in a reproduction apparatus, the amount of the display data is smaller than the amount of the audio data. The reason is that the amount of the plurality of types of display data becomes substantially equal to the amount of one audio data pack by being packed into one pack. This facilitates management of the data amount performed pack by pack.

The display data pack 123 includes a header 134. In the header 134, management information for the display data pack 123 is described. Each audio data pack 125 includes a header 132. In the header 132, management information for the audio data pack 125 is described.

The reproduction apparatus analyzes the header of each pack to identify an attribute of the pack. For example, the reproduction apparatus analyzes the headers 132 of the plurality of audio data packs 125 to select one audio data pack 125 of a prescribed type, and reproduces the selected audio data pack 125. Regarding the display data, the reproduction apparatus separates the display data pack 123 from the rest of the recording unit 121 and then analyzes the header 134 of the display data pack 123. Thus, the reproduction apparatus selects display data 152 of a prescribed type among the plurality of types of display data 152 and reproduces the selected display data 152. By performing selection of audio data and display data in the separate processes as described above, the audio data and display data can be selected independently.

The recording unit 121 further includes a reproduction control pack 122, in which control information on reproduction of data packs is stored. The reproduction control pack 122 includes a header 130 and control information 131. Described in the header 130 are, for example, a start code for identifying the start of the reproduction control pack 122, an identification code for identifying that the pack is the reproduction control pack 122, the number of packs included in the recording unit 121, system information such as a data transfer rate and a buffer memory size required for data reproduction, and a data length of the control information 131. Described in the control information 131 are, for example, reproduction control information used for normal reproduction, such as reproduction time, and data retrieval control information used for special reproduction, such as the address to be read next during the fast reproduction.

The audio data pack 125 will now be described in detail. Each audio data pack 125 includes the header 132 and an audio data stream 133. Described in the header 132 are, for example, a start code for identifying the start of the audio data pack 125, an identification code for identifying that the pack is the audio data pack 125, an audio data identification code for identifying the type of the audio data included in the audio data pack 125, reproduction time information 150, data format identification information for identifying the data format of the audio data stream 133, and a data length of the audio data stream 133.

The reproduction apparatus identifies an audio data pack 125 of a prescribed type by referring to the audio data identification code stored in the header 132. Thus, the audio data pack 125 storing, for example, the Japanese audio data can be selectively reproduced. The audio data stream 133 has been coded with the linear PCM, MPEG audio, AC3 system or the like. The reproduction apparatus identifies the data format of the audio data stream 133 by referring to the data format identification information stored in the header 132. In accordance with the data format thereof, an appropriate reproduction system of the audio data stream 133 can be selected. As a result, audio data of a plurality of data formats can be reproduced by one reproduction apparatus.

The display data pack 123 will now be described in detail. The display data pack 123 includes the header 134 and a display data group 135. The display data group 135 includes the plurality of types of display data 152. Described in the header 134 are, for example, a start code for identifying the start of the display data pack 123, an identification code for identifying that the pack is the display data pack 123, reproduction time information 151, and a data length of the display data group 135.

The reproduction time information 151 stored in the display data pack 123 and the reproduction time information 150 stored in the audio data pack 125 are used to reproduce and output the display data and the audio data synchronously with each other. The reproduction time information 151 represents the time to reproduce the display data pack 123, and the reproduction time information 150 represents the time to reproduce the audio data pack 125. The reproduction apparatus controls the display data and the audio data to be output synchronously with each other by comparing the reproduction time information 151 stored in the display data pack 123 and the reproduction time information 150 stored in the audio data pack 125.

As described above, the display data group 135 includes the plurality of types of display data 152, for example, character information in a plurality of languages such as Japanese character information, English character information, French character information, and German character information, as well as musical note information, logo information and graphic information.

Each of the plurality of types of display data 152 includes an identification code 137, data format identification information 138, a data length 139, and bit map data 140. The identification code 137 is used for identifying the type of the display data 152. The data length 139 represents the length of the bit map data 140 described thereafter. By using the identification code 137 and the data length 139, a desired type of display data 152, for example, display data representing a Japanese character string or display data representing a musical note may be reproduced. The data format identification information 138 is used for determining whether the bit map data 140 has been compression-coded using run length coding or non-compression-coded. The reproduction apparatus selects an appropriate reproduction system in accordance with the data format identified by referring to the data format identification information 138. Thus, the bit map data 140 can be reproduced and output regardless of the data format.

The audio data can represent a plurality of languages such as Japanese, English and French. The present invention is not limited to the types or number of types of audio data.

The display data can represent a plurality of character strings in a plurality of languages such as Japanese and English. The display data can represent a musical note corresponding to the audio data reproduced simultaneously therewith. The display data can represent a graphic such as a logo. The present invention is not limited to the types or number of types of display data.

The recording medium according to the present invention can store a plurality of types of audio data and a plurality of types of display data in a recording unit within a unit of prescribed time period t. For example, when character strings in a plurality of languages of a plurality of countries are recorded in the recording medium as display data, such a recording medium can be commonly supplied in the plurality of countries.

From the viewpoint of software producers, such a common recording medium has a significant effect of eliminating a complicated procedure of producing, supplying and managing software in correspondence with each of a plurality of languages and of allowing them to produce, supply and manage software common for the plurality of languages.

From the viewpoint of users, such a common recording medium, which allows them to select any of the plurality of languages, provides a high quality user interface.

The display data is usable for displaying graphics, such as a logo, as well as characters. For example, by reproducing the display data representing the sheet music or musical notes of a tune stored as the audio data synchronously with the audio data, the sheet music or musical notes can be displayed while the tune is played. Thus, a higher quality user interface can be provided.

The time period t used as a unit for packing is arbitrary. For example, the time period t can be 0.5 second.

The start of each pack can be matched with the start of a recording sector having a capacity of, for example, 2048 bytes. Thus, the recording position on the recording medium can be managed more easily.

The size of the display data pack 123 is arbitrary. For example, the data size can be about 2048 bytes.

The size of the display data group 135 is arbitrary. It is preferable that the size of the display data pack 123 and the size of the display data group 135 have a specific relationship. For example, when the size of the display data pack 123 is about 2048 bytes, the size of the display data group 135 is preferably about 2019 bytes. When the size of the display data group 135 is less than 2019 bytes, the size of the display data group 135 is preferably adjusted by inserting stuffing data or the like.

In the first example of a re cording medium according to the present invention, data for one title is recorded as one data file. The present invention is not limited to such a system. Data for one title can be divided and recorded into a plurality of data files. In such a case, information regarding the division (for example, relationship between the plurality of data files) is described in the management information file 104.

The header 134 of the display data pack 123, the header 130 of the reproduction control pack 122, and the header 132 of the audio data pack 125 which are described in detail above are only exemplary, and the present invention is not limited to such structures for t he headers. In these headers, information regarding other data packs can be described.

EXAMPLE 2

Recording medium

A second example of a recording medium according to the present invention will now be described.

A recording medium in the second example according to the present invention has a structure similar to that of the recording medium in the first example. In the second example also, the display data pack 123 and the audio data packs 125 are recorded in the recording medium as shown in FIG. 1. The recording medium in the second example is different from the recording medium in the first example in that at least one of the plurality of types of display data 152 included in the display data group 135 is character information corresponding to the audio data. For example, when Japanese audio data is recorded, a Japanese character string can be recorded as at least one of the plurality of types of display data 152 in the display data group 135. For example, lyrics or liner notes in the same language as that of the music software can be recorded a s display data 152. Accordingly, data in a plurality of languages can be stored in one recording medium as display data.

From the viewpoint of software producers, such a common recording medium has a significant effect, for example, as described in the first example. From the viewpoint of users, such a common recording medium, which allows them to selectively display lyrics of a song in any of the plurality of languages, provides a high quality user interface.

EXAMPLE 3

Recording medium

A third example of a recording medium according to the present invention will now be described.

A recording medium in the third example according to the present invention has a structure similar to that of the recording medium in the first example. In the third example also, the display data pack 123 and the audio data packs 125 are recorded in the recording medium as shown in FIG. 1. The recording medium in the third example is different from that of the first example in that the display data is level-sliced bit map data which is generated by run length coding. The bit map data has been coded using an MR or MMR coding, both of which are standard coding systems for level-sliced image data. By using such coded display data, redundancy of information can be efficiently reduced. Thus, a limited recording capacity in the recording medium can be effectively used. Such effective use of the recording capacity increases, for example, available recording time, data amount allocated for audio data, and types of recordable display data. The bit map data can be coded using any run length coding system in lieu of the MR or MMR coding. In the recording medium in the third example, data format identification information 138 is not required.

The recording medium in the third example can additionally have a start code for identifying the start of each type of display data 152 in the display data group 135. In this case, one type of the display data 152 can be selected without the data length 139 representing the length of the following bit map data 140.

In the first through third examples, the audio data can be compression-coded or non-compression-coded. There is no specific limitation regarding the coding system.

An optical disk can be used as the recording medium, but the recording medium according to the present invention is not limited to an optical disk.

When an optical disk is used as the recording medium, the optical disk can have a thickness of 0.6 mm, but a recording medium according to the present invention can have an arbitrary thickness.

An optical disk used as the recording medium can be a one-sided optical disk which allows data to be recorded on one side or a two-sided optical disk which allows data to be recorded on two sides. Alternatively, an optical disk allowing data to be recorded in a plurality of layers can be used.

Data to be recorded to the recording medium can include video data or any other type of data.

Reproduction apparatus

Hereinafter, a reproduction apparatus according to the present invention will now be described with reference to FIGS. 2 through 8.

EXAMPLE 1

Reproduction apparatus

Figure 2:
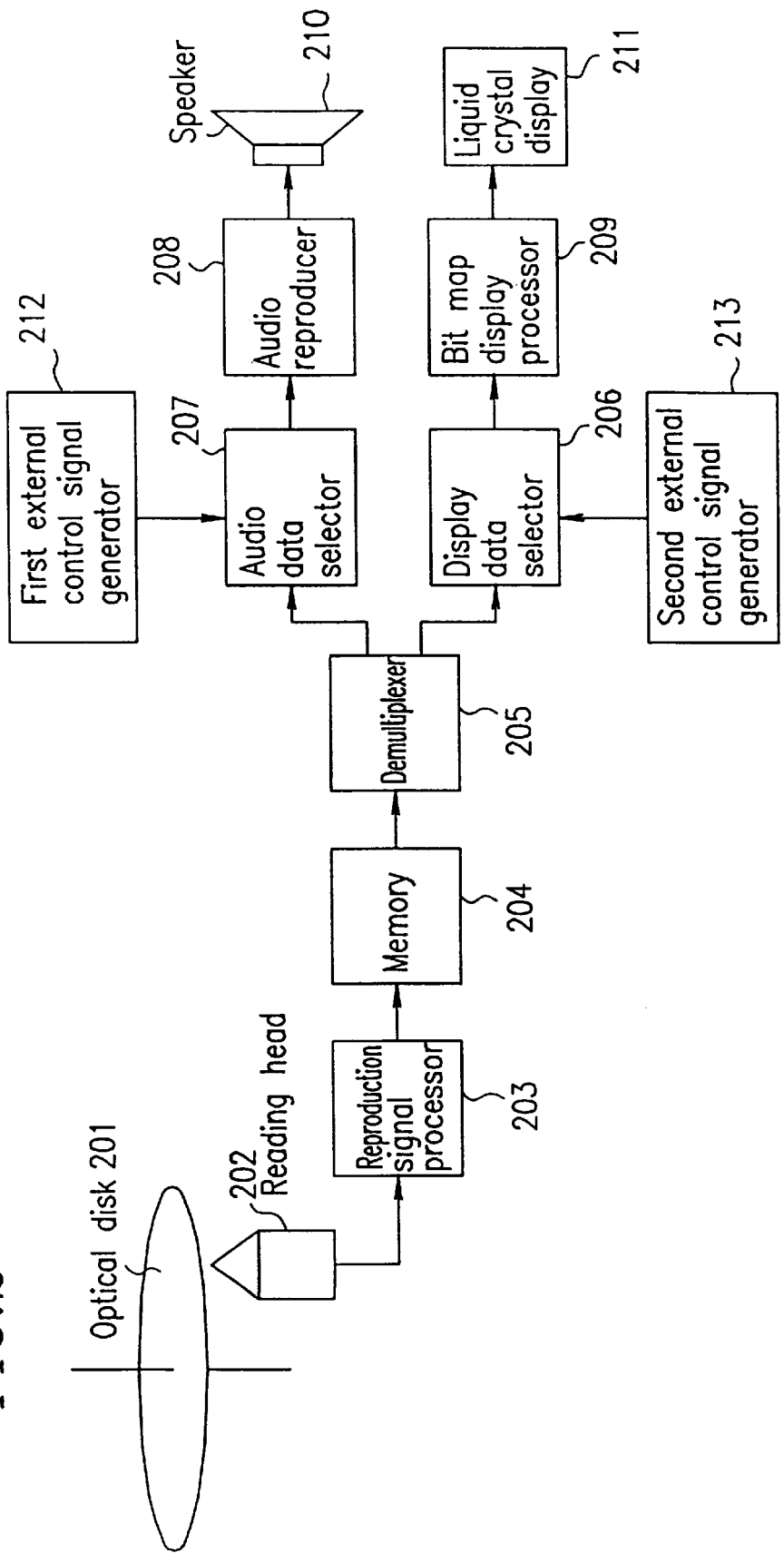
FIG. 2 is a block diagram of a reproduction apparatus in a first example according to the present invention.

FIG. 2 shows a structure of a first example of a reproduction apparatus according to the present invention. The reproduction apparatus in the first example (FIG. 2) reproduces audio data and display data stored in an optical disk 201. The optical disk 201 is a recording medium according to the present invention, which has the structure shown in FIG. 1.

The operation of the reproduction apparatus in the first example (FIG. 2) will now be described.

Data recorded to the optical disk 201 is read by a reading head 202. A reproduction signal processor 203 demodulates the read data and performs error correction. The data processed by the reproduction signal processor 203 is first accumulated in a memory 204. The memory 204 is used for stabilizing the effective speed of data transfer to improve the data transfer efficiency. The data accumulated in the memory 204 are sequentially input to a demultiplexer 205.

The demultiplexer 205 identifies audio data and display data included in the recorded data and outputs the audio data and the display data separately. As described above, the optical disk 201 stores data as shown in FIG. 1. The demultiplexer 205 identifies the identification code described in the header 132 of each of the plurality of audio data packs 125 and the identification code described in the header 134 of the display data pack 123 to separate the audio data and the display data from each other. The audio data packs 125 separated from the display data packs 123 by the demultiplexer 205 are input to an audio data selector 207. The display data pack 123 separated from the audio data pack 125 by the demultiplexer 205 is input to an display data selector 206.

The audio data selector 207 selectively outputs one audio data pack 125 out of the plurality of types of audio data packs 125 in accordance with a control signal generated by a first external control signal generator 212. For example, when the audio data packs 125 corresponding to a plurality of languages such as Japanese, English, French and German are stored as shown in FIG. 1, the audio data selector 207 selectively outputs the audio data pack 125 corresponding to one specific language (for example, English) out of the plurality of languages.

The audio data selector 207 identifies the types of the audio data packs 125 by referring to the identification code stored in the header 132 of each audio data pack 125 to selectively output the audio data pack 125 of a specific type.

The selection of the audio data pack 125 can be performed by any appropriate method. For example, the user can input a command representing the type of the desired audio data pack 125 from outside the reproduction apparatus so that the audio data pack 125 of the type corresponding to the command can be selected. Alternatively, the type of the audio data pack 125 to be selected can be fixed in advance.

The audio data pack 125 selected by the audio data selector 207 is reproduced by an audio reproducer 208 and output by a speaker 210.

The display data selector 206 selectively outputs one type of display data 152 out of the plurality of types of display data 152 included in the display data group 135 in accordance with a control signal generated by a second external control signal generator 213. For example, when the plurality of types of display data 152 corresponding to a plurality of languages such as Japanese, English, French and German are stored as shown in FIG. 1, the display data selector 206 selectively outputs one type of display data 152 corresponding to one specific language (for example, English) out of the plurality of types of display data 152.

The display data selector 206 identifies the types of display data 152 by referring to the identification code 137 stored in each type of the display data 152 and selectively outputs the bit map data 140 corresponding to the selected display data 152.

The selection of the display data 152 can be performed by any appropriate method. For example, the user can input a command representing the desired type of display data 152 from outside the reproduction apparatus so that the display data 152 of the type corresponding to the command can be selected. Alternatively, the type of the display data 152 to be selected can be fixed in advance.

The bit map data 140 corresponding to the desired type of display data 152 selected by the display data selector 206 is processed by a bit map display processor 209 and displayed by a liquid crystal display 211.

In the reproduction apparatus in the first example (FIG. 2), a specific type of display data 152 can be selectively displayed from a recording medium storing a plurality of types of display data 152. For example, when a plurality of types of display data 152 corresponding to a plurality of languages are stored in the optical disk, the type of display data 152 specified by a control signal generated by a second external control signal generator 213 is selectively displayed. Thus, software corresponding to a plurality of languages can be processed by one reproduction apparatus.

In the case where character data is recorded into a recording medium using a prescribed character code, the character data can be recorded at a high compression ratio. However, in order to process software corresponding to a plurality of languages, a reproduction apparatus needs to have a ROM for storing a plurality of look-up tables respectively corresponding to the plurality of languages. Storing a plurality of look-up tables enlarges the hardware and thus increases the production cost. If a reproduction apparatus is provided for each of the plurality of languages, reproduction apparatuses of different types need to be produced separately. This raises the production cost and requires complicated and troublesome supply and management procedures.

By contrast, a recording medium according to the present invention can store bit map data in lieu of character data as display data. A reproduction apparatus according to the present invention selectively reproduces bit map data corresponding to a specific language out of bit map data stored in the recording medium corresponding to a plurality of languages. According to the present invention, a significant benefit can be obtained in that one reproduction apparatus which can support a plurality of languages without enlarging the hardware is produced and supplied.

Since the bit map data is used as display data, graphic patterns such as sheet music of music software can be displayed relatively easily as well as character data. Thus, the reproduction apparatus according to the present invention can provide a high quality user interface.

EXAMPLE 2

Reproduction apparatus

Figure 3:
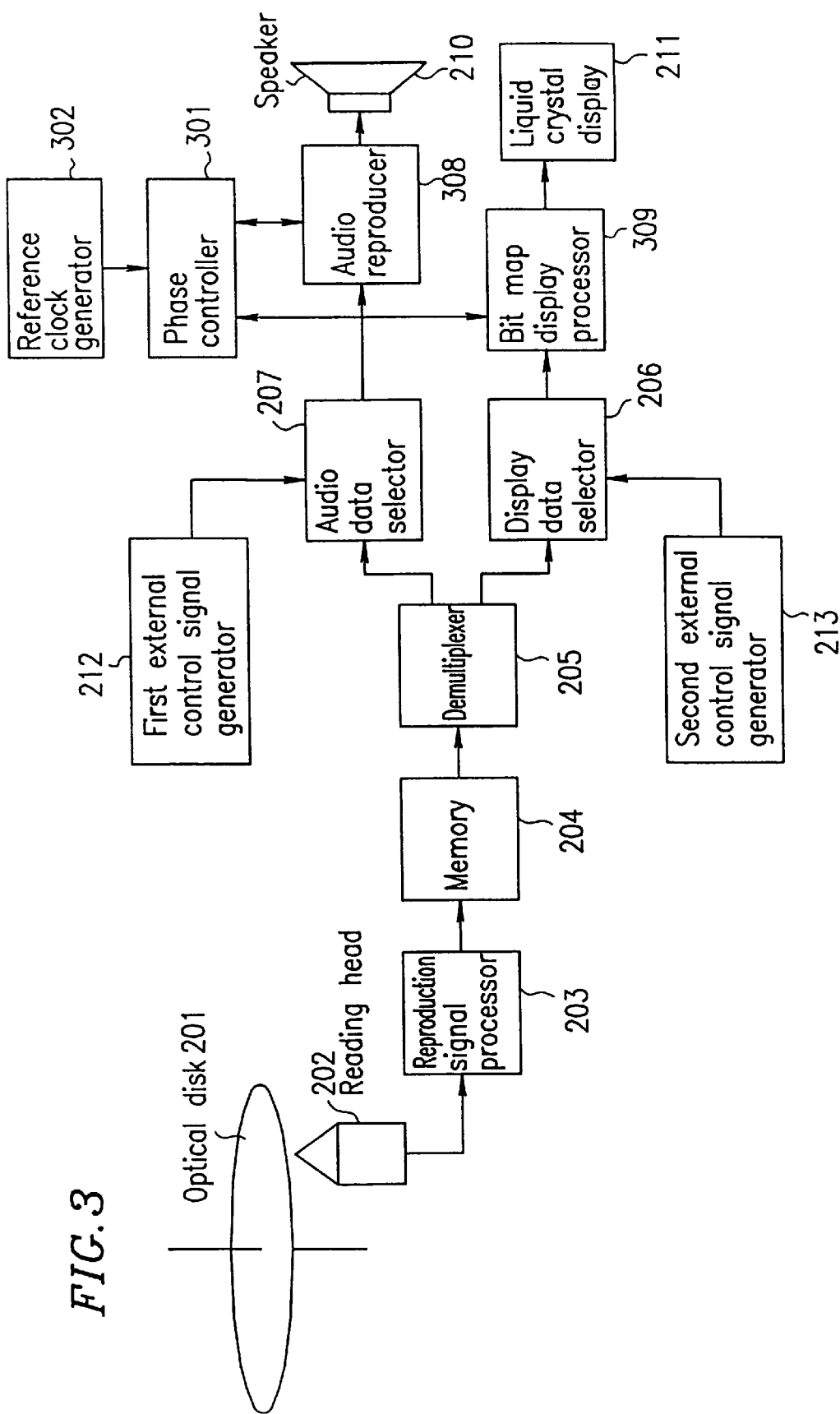
FIG. 3 is a block diagram of a reproduction apparatus in a second example according to the present invention.

FIG. 3 shows a structure of a second example of a reproduction apparatus according to the present invention. In the reproduction apparatus in the second example (FIG. 3), a prescribed type of audio data pack 125 is selected by the audio data selector 207, and a prescribed type of display data 152 is selected by the display data selector 206 as in the reproduction apparatus in the first example (FIG. 2). The reproduction apparatus in the second example (FIG. 3) is different from the reproduction apparatus in the first example (FIG. 2) in including a reference clock generator 302 and a phase controller 301.

The phase controller 301 controls an audio reproducer 308 for reproducing the selected audio data pack 125 and a bit map display processor 309 for displaying the selected display data 152. Thus, the phase controller 301 controls the reproduction time of the audio data and the reproduction time of the display data in accordance with a reference clock generated by the reference clock generator 302.

In other words, the phase controller 301 controls the audio reproducer 308 and the bit map display processor 309 so that the display data is displayed in the same time period in which the audio data is reproduced. For example, when the audio data pack 125 is 0.5 second long, the phase controller 301 controls the bit map display processor 309 so that the display data 152 corresponding to the selected audio data pack 125 is displayed for 0.5 second. Furthermore, the phase controller 301 controls the audio reproducer 308 and the bit map display processor 309 so that when the audio reproducer 308 starts reproducing the subsequent audio data pack 125, the bit map display processor 309 simultaneously starts displaying the subsequent display data 152 corresponding to the above-mentioned subsequent audio data pack 125.

By reproducing the audio data and the display data synchronously with each other, the display data can be displayed as a moving picture. For example, data representing lyrics or sheet music of a tune can be displayed along with the tune represented by the audio data. Thus, the reproduction apparatus in the second example (FIG. 3) provides a high quality user interface.

EXAMPLE 3

Reproduction apparatus

Figure 4:
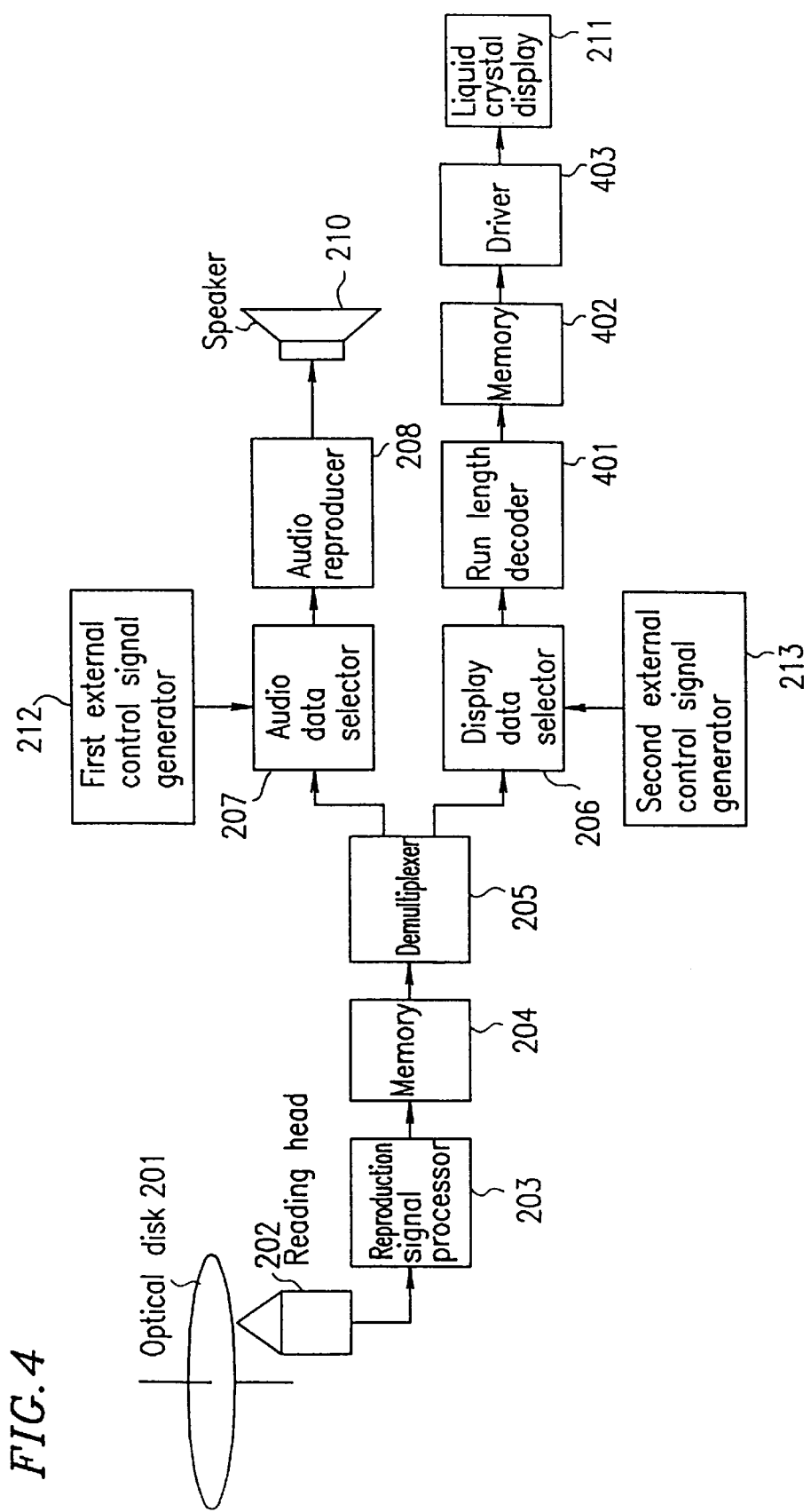
FIG. 4 is a block diagram of a reproduction apparatus in a third example according to the present invention.

FIG. 4 shows a structure of a third example of a reproduction apparatus according to the present invention. In the reproduction apparatus in the third example (FIG. 4), a prescribed type of audio data pack 125 is selected by the audio data selector 207, and a prescribed type of display data 152 is selected by the display data selector 206 as in the reproduction apparatus in the first example (FIG. 2). The reproduction apparatus in the third example (FIG. 4) is different from the reproduction apparatus in the first example (FIG. 2) in that the bit map data 140 included in the selected display data 152 is decoded using run length decoding.

A run length decoder 401 decodes the bit map data 140 included in the display data 152 coded by run length coding. A memory 402 accumulates the decoded bit map data 140 therein. A driver 403 drives the liquid crystal display 211 based on the information accumulated in the memory 402 to display the display data 152.

In the reproduction apparatus in the third example (FIG. 4), display data efficiently coded by run length coding can be decoded to be displayed. Such a reproduction apparatus can reproduce data efficiently stored in a recording medium having a limited memory capacity.

Any appropriate system can be used for run length coding. For example, MR or MMR system can be used, both of which are standard systems for level-sliced image data.

EXAMPLE 4

Reproduction apparatus

Figure 5:
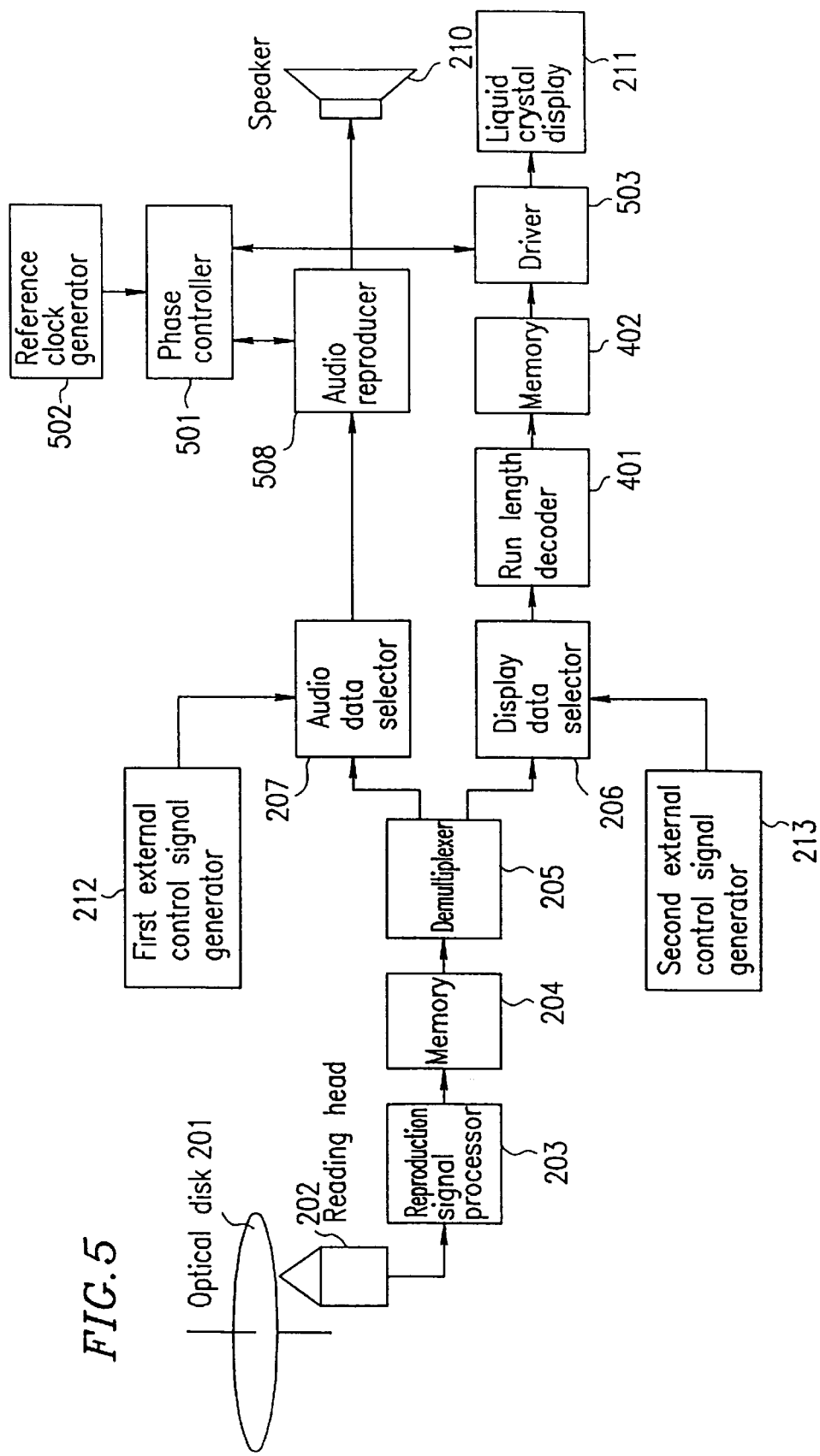
FIG. 5 is a block diagram of a reproduction apparatus in a fourth example according to the present invention.

FIG. 5 shows a structure of a fourth example of a reproduction apparatus according to the present invention. In the reproduction apparatus in the fourth example (FIG. 5), the bit map data 140 of the desired display data 152 is decoded by the run length decoder 401 as in the reproduction apparatus in the third example (FIG. 4). The reproduction apparatus in the fourth example (FIG. 5) is different from the reproduction apparatus in the third example (FIG. 4) in including a reference clock generator 502 and a phase controller 501.

The phase controller 501 controls an audio reproducer 508 for reproducing the selected audio data pack 125 and a driver 503 for displaying the selected display data 152. Thus, the phase controller 501 controls the reproduction time of the audio data and the reproduction time of the display data in accordance with a reference clock generated by the reference clock generator 502.

In other words, the phase controller 501 controls the audio reproducer 508 and the driver 503 so that the display data is displayed in the same time period in which the audio data is reproduced. For example, when the audio data pack 125 is 0.5 second long, the phase controller 501 controls the driver 503 so that the display data 152 corresponding to the selected audio data pack 125 is displayed for 0.5 second. Furthermore, the phase controller 501 controls the audio reproducer 508 and the driver 503 so that when the audio reproducer 508 starts reproducing the subsequent audio data pack 125, the driver 503 simultaneously starts displaying the following display data 152 corresponding to the above-mentioned subsequent audio data pack 125.

By reproducing the audio data and the display data synchronously with each other, the display data can be displayed as a moving picture. For example, data representing lyrics or sheet music of a tune can be displayed along with the tune represented by the audio data. Thus, the reproduction apparatus in the fourth example (FIG. 5) provides a high quality user interface.

EXAMPLE 5

Reproduction apparatus

Figure 6:
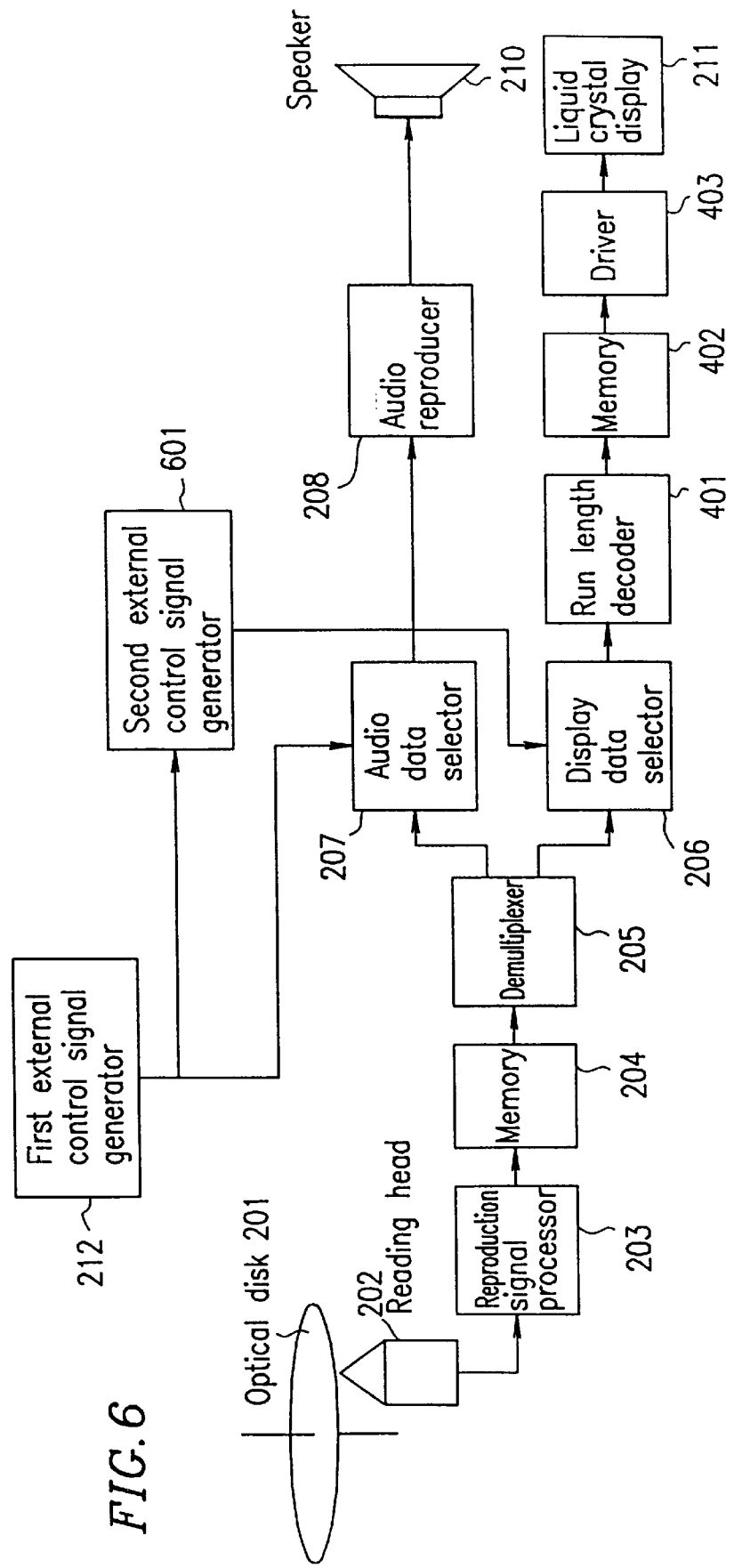
FIG. 6 is a block diagram of a reproduction apparatus in a fifth example according to the present invention.

FIG. 6 shows a structure of a fifth example of a reproduction apparatus according to the present invention. In the reproduction apparatus in the fifth example (FIG. 6), the bit map data 140 of a prescribed type of display data 152 is decoded by the run length decoder 401 as in the reproduction apparatus in the third example (FIG. 4). The reproduction apparatus in the fifth example (FIG. 6) is different from the reproduction apparatus in the third example (FIG. 4) in that a second external control signal generator 601 operates in a different manner from the second external signal generator 213.

The second external control signal generator 601 outputs a second external control signal, which depends on a first external control signal output by the first external control signal generator 212 for selecting the audio data.

For example, when the first external control signal generator 212 outputs a first external control signal which instructs the audio data selector 207 to select English audio data, the second external control signal generator 601 outputs a second external control signal which instructs the display data selector 206 to select display data representing an English character string.

In the reproduction apparatus in the fifth example (FIG. 6), the display data depending on the selected audio data can be selectively displayed. For example, when audio data representing an English song is selected, display data representing an English character string can be displayed. Thus, software corresponding to a plurality of languages can be processed by one reproduction apparatus.

The second external control signal generator 601 can output a second external control signal in accordance with a command which is input from outside the reproduction apparatus in the fifth example (FIG. 6). For example, the second external control signal generator 601 can be set so that display data corresponding to the audio data is automatically selected to be displayed unless the user inputs a command, and so that when the user inputs a command, a specific type of display data corresponding to the command is selectively displayed. Thus, the reproduction apparatus in the fifth example (FIG. 6) provides a high quality user interface.

EXAMPLE 6
Reproduction apparatus

Figure 7:
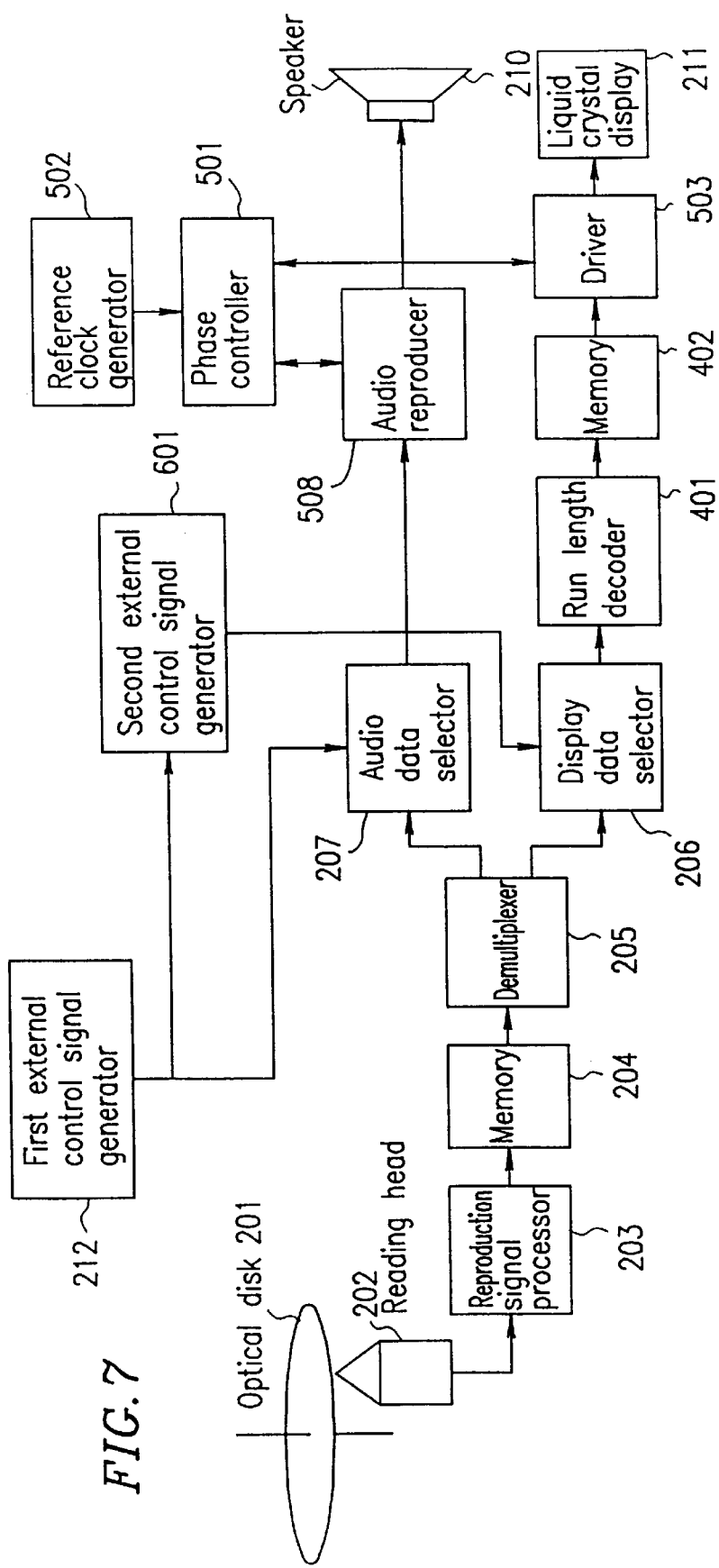
FIG. 7 is a block diagram of a reproduction apparatus in a sixth another example according to the present invention.

FIG. 7 shows a structure of a sixth example of a reproduction apparatus according to the present invention. In the reproduction apparatus in the sixth example (FIG. 7), the bit map data 140 of a prescribed type of desired display data 152 is decoded by the run length decoder 401, and the reproduction time for the audio data and the reproduction time for the display data are controlled by the phase controller 501 as in the reproduction apparatus in the fourth example (FIG. 5). The reproduction apparatus in the sixth example (FIG. 7) is different from the reproduction apparatus in the fourth example (FIG. 5) in that a second external control signal generator 601 operates in a different manner from the second external signal generator 213.

The second external control signal generator 601 outputs a second external control signal, which depends on a first external control signal output by the first external control signal generator 212 for selecting the audio data.

For example, when the first external control signal generator 212 outputs a first external control signal which instructs the audio data selector 207 to select English audio data, the second external control signal generator 601 outputs a second external control signal which instructs the display data selector 206 to select display data representing an English character string.

In the reproduction apparatus in the sixth example (FIG. 7), the display data depending on the selected audio data can be selectively displayed. For example, when audio data representing an English song is selected, display data representing an English character string can be displayed. Thus, software corresponding to a plurality of languages can be processed by one reproduction apparatus.

By reproducing the audio data and the display data synchronously with each other, the display data can be displayed as a moving picture. For example, data representing lyrics or sheet music of a tune can be displayed along with the tune represented by the audio data. Thus, the reproduction apparatus in the sixth example (FIG. 7) provides a high quality user interface.

The second external control signal generator 601 can output a second external control signal in accordance with a command which is input from outside the reproduction apparatus in the sixth example (FIG. 7). For example, the second external control signal generator 601 can be set so that display data corresponding to the audio data is automatically selected to be displayed unless the user inputs a command, and so that when the user inputs a command, a specific type of display data corresponding to the command is selectively displayed. Thus, the reproduction apparatus in the sixth example (FIG. 7) provides a higher quality user interface.

EXAMPLE 7
Reproduction apparatus

Figure 8:
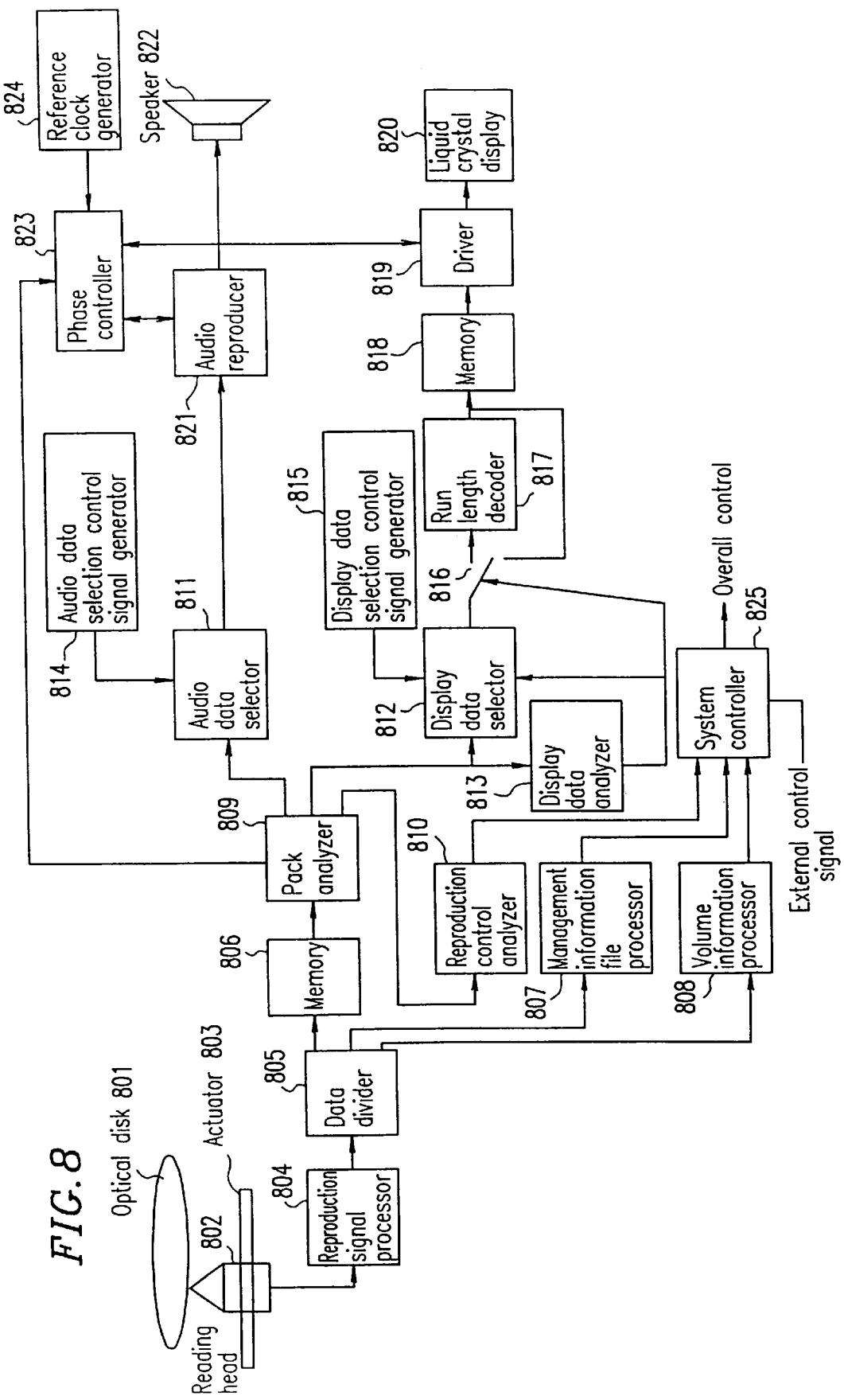
FIG. 8 is a block diagram of a reproduction apparatus in a seventh example according to the present invention.

FIG. 8 shows a structure of a seventh example of a reproduction apparatus according to the present invention. The reproduction apparatus in the seventh example (FIG. 8) reproduces audio data and display data stored in an optical disk 801. The optical disk 801 is a recording medium according to the present invention, which has the structure shown in FIG. 1.

The operation of the reproduction apparatus in the seventh example (FIG. 8) will be described with reference to FIGS. 1 and 8.

A system controller 825 is provided for controlling each of a plurality of sections in the reproduction apparatus shown in FIG. 8. The system controller 825 outputs a control signal for controlling each section of the reproduction apparatus in accordance with an external control signal input by the user and control information stored in the optical disk 801.

Data recorded to the optical disk 801 is read by a reading head 802. The reading head 802 reads data in accordance with an actuator 803 which is controlled by the system controller 825. The read data is demodulated and treated with error correction by a reproduction signal processor 804. A data divider 805 divides the data output from the reproduction signal processor 804 into the volume information 102, the management information file 104, and data files 120 in accordance with an instruction from the system controller 825. The volume information 102 is input to a volume information processor 808. The management information file 104 is input to a management information file processor 807. Each data file 120 is input to a buffer memory 806.

When reproduction of the optical disk 801 starts, the volume information 102 is first identified by the volume information processor 808. Then, based on the volume information 102 identified, an address in the optical disk 801 at which the management information file 104 is recorded is specified.

The system controller 825 controls the actuator 803 to read the management information file 104 recorded in the specified address. The management information file 104 read by the actuator 803 is analyzed by the management information file processor 807. By this analysis, the titles stored in the optical disk 801, reproduction time, the number of types of audio data, whether display data is stored or not, the types of display data, and the like are identified. Such information is provided to the user. For example, such information is displayed on a liquid crystal display 820. The liquid crystal display 820 is controlled by the overall control signal output from the system controller 825.

Referring to such information, a request for selecting a desired type of audio data and display data is input to the reproduction apparatus by, for example, the user. Then, the request is supplied to the system controller 825 as an external control signal.

The system controller 825 drives an audio data selection control signal generator 814 for generating a control signal for selecting audio data and also drives a display data selection control signal generator 815 for generating a control signal for selecting display data. Selection of audio data and display data will be described later.

When an external control signal is not generated by the user or the like, audio data and display data can be selected based on a prescribed initial condition.

The external control signal includes information which specifies the title to be reproduced. Such information is identified by the system controller 825. Then, the system controller 825 controls the actuator 803 to read the data file 120 storing the title specified by the external control signal from the optical disk 801. The read data file 120 is accumulated in the buffer memory 806.

The system controller 825 monitors the amount of data occupying the buffer memory 806 and controls data reading so as to avoid underflow or overflow of the buffer memory 806. By using the buffer memory 806 in this manner, the effective speed of data transfer can be stabilized and the data transfer efficiency can be improved.

The data file 120 accumulated by the buffer memory 806 is input to a pack analyzer 809. The pack analyzer 809 analyzes the recording unit 121 included in the data file 120 to divide the recording unit 121 into the reproduction control pack 122, the display data pack 123, and the audio data pack group 124. Each pack or the pack group is analyzed by identifying the start of the pack with the start code included in the header of the pack and analyzing the rest of the information stored in the header. The recording unit 121 is divided into the packs 122, 123 and 124 by identifying the identification code stored in the header of each pack or the pack group. The reproduction time information 150 stored in the header 132 of each audio data pack 125 and reproduction time information 151 stored in the header 134 of the display data pack 123 are input to a phase controller 823.

The reproduction control pack 122 separated from the rest of the recording unit 121 is input to a reproduction control analyzer 810. The reproduction control analyzer 810 reads the system information, reproduction control information, and data retrieval information described in the reproduction control pack 122. Such information is input to the system controller 825. The system controller 825 controls reproduction, by referring to such information.

The audio data pack group 124 is input to an audio data selector 811. The audio data selector 811 selectively outputs a prescribed audio data pack 125 out of the plurality of audio data packs 125 included in the audio data pack group 124 in accordance with a control signal output from an audio data selection control signal generator 814. The prescribed audio data pack 125 is identified by referring to an audio data identification code described in the header 130. For example, when reproduction of Japanese audio data is requested, the audio data pack 125 storing the Japanese audio data is identified by referring to the audio data identification code, and the identified audio data pack 125 is selectively output.

The audio data pack 125 selectively output is reproduced by an audio reproducer 821 and is output to a speaker 822 as an audio signal. The audio reproducer 821 identifies the data format of the audio data stream 133 by referring to data format identification information stored in the header 130 of the audio data pack 125, and reproduces the audio data in accordance with the data format. Thus, data coded with one of a plurality of coding systems such as the linear PCM, MPEG audio, or AC3 systems can be reproduced by one audio reproducer 821.

The display data pack 123 separated from the rest of the recording unit 121 is input to a display data analyzer 813 and also to a display data selector 812. The display data analyzer 813 analyzes the identification code 137, the data format identification information 138 and the data length 139 of each of a plurality of types of display data 152 of the display data group 135 included in the display data pack 123. Thus, the types of the display data such as Japanese character data, English character data, and musical note data are identified. Also, the data format which indicates whether the bit map data of each type of display data has been compression-coded by using run length coding or non-compression-coded is identified.

The display data selector 812 selectively outputs a desired type of display data 152 based on an analysis result of the display data analyzer 813 and a control signal generated by the display data selection control signal generator 815. The display data analyzer 813 controls a switch 816 in accordance with the analysis result. When the display data 152 has been run-length-coded, the switch 816 is controlled to cause the display data 152 to be input to a run length decoder 817. The display data 152 which has been run-length-coded is decoded by the run length decoder 817. The bit map data 140 of the decoded display data 152 is accumulated in a memory 818. When the bit map data 140 of the display data 152 has been non-compression-coded, the switch 816 is controlled to cause the display data 152 to be input to the memory 818 and bypass the run length decoder 817.

The bit map data 140 of the display data 152 accumulated in the memory 818 is input to a driver 819. The driver 819 drives the liquid crystal display 820 so that the bit map data 140 is displayed by the liquid crystal display 820.

The audio reproducer 821 and the driver 819 are controlled by the phase controller 823. The phase controller 823 controls the reproduction time for the audio data and the reproduction time for the display data in accordance with the reproduction time information 150 in the audio data pack 125, the reproduction time information 151 of the display data pack 123, and a reference clock generated by a reference clock generator 824. In other words, the phase controller 823 controls the audio reproducer 821 and the driver 819 so that the reproduction time for the audio data and the reproduction time for the display data, corresponding to the audio data, match.

The audio data and the display data are synchronized by adjusting the reproduction time for the display data so as to be synchronized with the reproduction time for the audio data. The reproduction time for the display data is adjusted by using the memory 818.

The display data can be characters or simple graphic information such as musical notes. The characters and the graphic information are displayed in a liquid crystal display. Accordingly, the amount of the display data is smaller than that of the audio data. The display data can be displayed by a simpler process than reproduction of the audio data. The display data can be transferred and also processed in a shorter period of time than the display data, thereby allowing the reproduction time for the display data to be adjusted in relation to the reproduction time for the audio data. As a result, the audio data and the display data can be synchronized with each other.

Since the amount of the display data is smaller than that of the audio data as described above, the size of the buffer memory 818 which is required for adjusting the reproduction time for the display data can be smaller than the size of the buffer memory which is required for adjusting the reproduction time for the audio data. Accordingly, the production cost of the reproduction apparatus in the seventh example (FIG. 8) can be reduced.

By reproducing the audio data and the display data synchronously with each other, the display data can be displayed as a moving picture. For example, data representing lyrics or sheet music of a tune can be displayed along with the tune represented by the audio data. Thus, the reproduction apparatus in the seventh example (FIG. 8) provides a high quality user interface.

In the above-described reproduction apparatuses according to the present invention, the optical disks 201 and 801 can be replaced with an arbitrary recording medium. The present invention is not limited to any specific type of recording medium.

The optical disks 201 and 801 can each have a thickness of 0.6 mm, but a recording medium according to the present invention can have an arbitrary thickness.

An optical disk used as the recording medium can be a one-sided optical disk which allows data to be recorded on one side or a two-sided optical disk which allows data to be recorded on two sides. Alternatively, an optical disk allowing data to be recorded in a plurality of layers can be used.

The reproduction apparatus can include a single reading head 202 or a plurality of reading heads 202. When a plurality of reading heads 202 are provided, the data can be read in parallel.

The reproduction apparatus can be a recording and reproduction apparatus additionally having a function of recording data onto the recording medium.

The audio data can be compression-coded or non-compression-coded. Regarding the compression coding system, there is no specific limitation.

The liquid crystal displays 211 and 820 can be replaced with an arbitrary display which can display bit map data. The present invention is not limited to any specific type of display.

The data to be recorded in the recording medium can include video data or any other type of data.

By a recording medium and a reproduction apparatus according to the present invention, display data can be displayed synchronously with the audio data corresponding to the display data, based on information on reproduction time for the audio data and information on reproduction time for the display data. For example, lyrics or sheet music of a tune can be displayed along the tune represented by the audio data. As appreciated from this, a reproduction apparatus according to the present invention provides a high quality user interface.

Furthermore, when a recording medium and a reproduction apparatus according to the present invention are used, one of a plurality of types of audio data can be selectively reproduced, and one of a plurality of types of display data can be selectively displayed. By this function, for example, an English character string can be displayed while music software in English is reproduced, and a Japanese character string can be displayed while music software in Japanese is reproduced. Thus, software corresponding to a plurality of languages can be processed by one reproduction apparatus.

From the viewpoint of software producers, such a common recording medium has a significant effect of eliminating a complicated procedure of producing, supplying and managing software in correspondence with each of a plurality of languages and of allowing them to produce, supply and manage software common for the plurality of languages more efficiently. From the viewpoint of users, such a common recording medium, which allows them to select any of the plurality of languages, is easier to use.

Moreover, a recording medium and a reproduction apparatus according to the present invention use bit map data as display data. Since a ROM for storing a look-up table, which is required when a character code is used, can be eliminated, the scale of the circuitry of the reproduction apparatus can be smaller. A smaller size of the circuitry becomes more advantageous as the reproduction apparatus supports more languages. The use of bit map data provides another advantage that data representing logos or musical notes, which cannot be represented by a character code, can be displayed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction apparatus, comprising:
   a reading section for reading data from a recording medium;
   an analyzer for analyzing the data read by the reading section to separate, from the data, an audio data group including a plurality of types of audio data and a display data group including a plurality of types of display data, thereby acquiring audio reproduction time information for regulating a time to reproduce each of the plurality of types of audio data and display reproduction time information for regulating a time to reproduce each of the plurality of types of display data;
   an audio selector for selecting one of the plurality of types of audio data in accordance with an audio data selection signal;
   a display selector for selecting one of the plurality of types of display data in accordance with a display data selection signal;
   an audio reproducer for reproducing the audio data selected by the audio selector;
   a display processor for reproducing the display data selected by the display selector; and
   a phase controller for controlling the audio reproducer and the display processor in accordance with the audio reproduction time information and the display reproduction time information so that a reproduction time for the audio data selected by the audio selector corresponds to a reproduction time for the display data selected by the display selector.

2. A reproduction apparatus according to claim 1, wherein the audio data group includes audio data corresponding to a first language and audio data corresponding to a second language different from the first language, and the display data group includes display data representing character information corresponding to at least one of the first language and the second language.

3. A reproduction apparatus according to claim 1, wherein at least one of the plurality of types of display data includes bit map data.

4. A reproduction apparatus according to claim 3, wherein the bit map data is variable-length data.

5. A reproduction apparatus according to claim 3, wherein the bit map data is run-length-coded data, and the reproduction apparatus further comprises a run length decoder for run-length-decoding the bit map data.

6. A reproduction apparatus according to claim 1, wherein the display data selection signal depends on the audio data selection signal.

7. A reproduction apparatus according to claim 6, wherein the audio data group includes audio data corresponding to a first language and audio data corresponding to a second language different from the first language, and when the audio data selection signal indicates that the audio data corresponding to the first language is selected, the display selection signal indicates that the display data corresponding to the first language is selected.

8. A reproduction apparatus according to claim 1, wherein the phase controller adjusts the reproduction time for the display data in relation with the audio data so that the audio data and the display data are synchronized with each other.

9. A reproduction apparatus according to claim 1, wherein each of the plurality of types of audio data is packed into an audio data pack having a prescribed size, and the display data group is packed into a display data pack having the prescribed size.

10. A reproduction apparatus according to claim 1, wherein the audio reproduction time information is included in header information of the audio data pack, and the display reproduction time information is included in header information of the display data pack.

11. A reproduction apparatus according to claim 10, wherein the analyzer acquires the audio reproduction time information by analyzing the header information in the audio data pack, and acquires the display reproduction time information by analyzing the header information in the display data pack.

* * * * *